J. S. BRENNAN.
VALVE.
APPLICATION FILED JULY 6, 1915.
1,170,602. Patented Feb. 8, 1916.
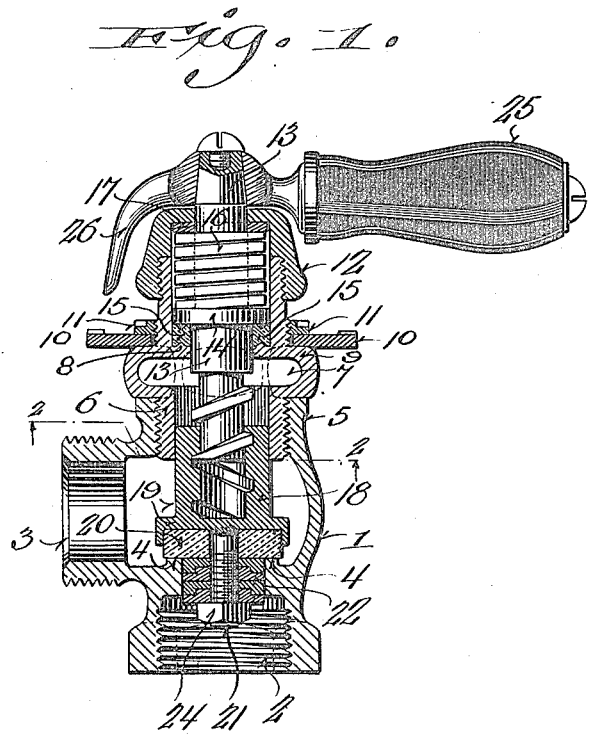
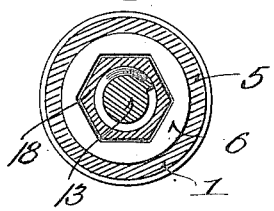

ial view taken on the line 2—2 Fig. 1.
UNITED STATES PATENT OFFICE.

JOHN S. BRENNAN, OF MILWAUKEE, WISCONSIN.

VALVE.

1,170,602.   Specification of Letters Patent.   Patented Feb. 8, 1916.

Application filed July 6, 1915.   Serial No. 38,160.

*To all whom it may concern:*

Be it known that I, JOHN S. BRENNAN, a citizen of the United States, and resident of Milwaukee, in the county of Milwaukee and State of Wisconsin, have invented certain new and useful Improvements in Valves; and I do hereby declare the following is a full, clear, and exact description thereof.

This invention relates to the subject of valves generally, and has more particular reference to valves that are adapted for use in connection with radiators.

The primary aim of the invention is to produce a valve that is simple, yet effective in operation, and one in which the necessary variation in the flow of pressure may be regulated, as well as to provide a valve that is of the quick-acting type in which means are provided for at all times retaining the same tight.

One practical form of the valve has been shown in the accompanying drawings wherein—

Figure 1 is a vertical sectional view of the improved valve. Fig. 2 is a transverse sectional view taken on the line 2—2 Fig. 1.

The improved valve comprises in its general organization a casing 1 equipped with an inlet and outlet, 2 and 3 respectively that are threaded as is usual. An upstanding valve seat 4 is formed at the inner end of the inlet 2. The upper end of neck 5 of the casing 1 is internally threaded for the reception of the depending externally threaded sleeve 6 of the shell 7. The shell 7 is provided with an internal ledge 8 having a gasket seat, the seat being provided with an annular upstanding gasket engaging flange. Externally the shell 7 has a bulged portion forming a seating ledge 9, and above said ledges, the shell is provided with upper and lower threads. An indicator plate 10 seats on ledge 9 and is removably clamped thereto by the threaded washer 11 that engages the lower threads of the shell mentioned above. The upper threads of the shell are engaged by the cap 12, said cap being provided with an opening through which the valve stem 13 extends. Stem 13, within the shell and adjacent the gasket seat 8 is provided with an annular flange 14 having an annular gripping flange on its under surface for engaging a gasket 15 mounted on seat 8. A spring 16 is coiled about stem 13 and its lower end bears on the flange 14 of stem 13, its upper end bearing on a washer 17 at the top of the cap 12. The spring 16 is of the expansive type, is constantly compressed and under pressure on flange 14 to cause said flange to tightly and firmly bear on the gasket 15. It will be observed by reference to Fig. 1, that the spring is formed of flat material and when compressed subserves the functions of a washer and that it not only normally holds flange 14 in engagement with gasket 15, but also binds the sleeve, stem and valve head in engagement when the valve is closed, this action being procured due to the compression of the washer. The lower portion of stem 13 is threaded for engaging the internal threads of sleeve 18 projecting outwardly from the valve 19, the valve being preferably cup-shaped for the reception of the resilient seat-engaging portion 20.

A bolt 21 depends centrally from the valve 19 for the reception of the spacer washers 22. The washers 22 are of a nesting type, the uppermost one having a flat upper surface that bears on the seat-engaging portion of the valve and a concaved under surface. The intermediate washer has an upper projection that interlocks with the concaved portion of the upper washer and a flat base. A second intermediate washer of the same type as the first described washer may next be used, and, in turn, another washer similar to the second described washer may be used to interlock therewith, the third washer being in interlocking engagement with the projection of the base washer, said base washer being engaged by the clamping nut 24 of the bolt 21 that holds the washers assembled. By employing washers of the type described it will be clear that leakage around the bolt 21 is prevented and that the seat-engaging portion 20 of the valve 19 is thereby firmly held to the valve. In addition, the washers provide simple means whereby the amount of pressure fluid or liquid permitted to pass through the valve may be regulated.

In the practical application of the invention, the washers are furnished in sets arranged in accordance with the general pressure required to pass through the valve. Minor variations in desired pressure are procured by reversing the positions of certain of the washers so that the respective projections are adjusted with respect to the concaved or recessed washer portions.

The outer end of the stem 13 is equipped with a handle 25 having a depending indicator 26 that coöperates with the indicator marks of the plate 10, in a manner well understood.

A prominent and distinctive feature of this invention is that the spring 16 is constantly exerting a downward pressure on the valve stem 13 that tends to hold the parts of the valve in tight relation so that rattling of the parts in operation, or relative movements of the parts incidental to external vibrations is prevented.

I claim:

1. A valve comprising a casing provided with a valve seat, and including a stem bore, an annular flange provided in said bore, a valve head having one end slidable in the bore, a unitary stem passed through the bore and threadedly engaged with the head, an annular flange on the stem outwardly of the flange of the bore, a resilient gasket disposed between the flanges, and a spring surrounding the stem between its flange and the outer end of the stem bore and bearing against said flange and against the casing at said end of the bore.

2. In a valve, the combination with a casing provided with an inlet and a valve seat surrounding the inlet of a valve head adapted to engage on the seat, a bolt extending from the head into the inlet, a plurality of washers on the bolt, certain of said washers being provided each with an annular recess in one face, annular projections on the other washers adapted to engage in the recesses or to engage the washer to form abutments and means for securing the washers on the bolt.

In testimony that I claim the foregoing I have hereunto set by hand at Milwaukee, in the county of Milwaukee, and State of Wisconsin, in the presence of two witnesses.

JOHN S. BRENNAN.

Witnesses:
H. JOSEPH DOYLE,
M. E. DOWNEY.